United States Patent Office 3,778,522
Patented Dec. 11, 1973

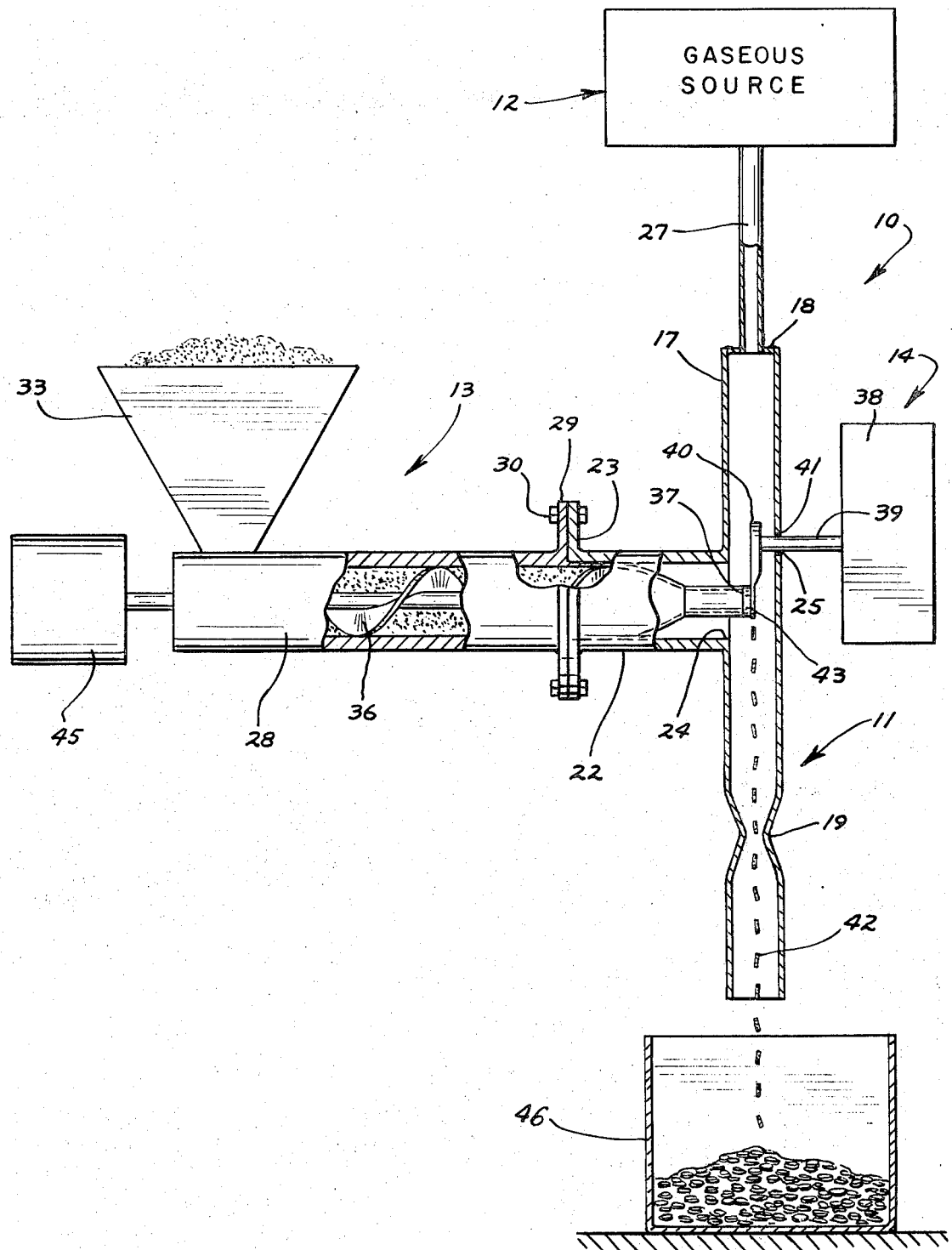

3,778,522
METHOD OF TEXTURIZING PROTEIN
Palmer K. Strommer, Osseo, Minn., assignor to
General Mills, Inc.
Filed July 23, 1971, Ser. No. 165,564
Int. Cl. A23j *3/00*
U.S. Cl. 426—511                                    10 Claims

ABSTRACT OF THE DISCLOSURE

A method for producing a bland textured protein product. The method includes the steps of mixing untextured protein material and water to form an untextured protein dough which is then extruded through a screw extruder into a flowing stream of hot, pressurized vapor such as steam or air.

---

The present invention relates to a method for treating food products and more particularly to a method for producing a bland textured protein product.

In recent years substantial effort has been directed toward treating untextured protein materials including vegetable protein material so as to provide such materials with texture and other characteristics commonly found in animal meat products. The vegetable protein materials are primarily soybean meal and flour; however, various other vegetable protein meals and flours may be used, typically, such materials as peanut, cottonseed, sesame seed and brewer flakes. Other protein materials that have been used include casein. It is generally preferred to use protein concentrates of such materials including at least about 50% protein by weight.

Various types of methods and apparatus have been used in the past to texturize the vegetable protein material. For example, solubilized soy protein has been extruded into an acid bath thereby forming texturized fibers. Recently it was discovered that particulate vegetable protein material may be texturized by propelling masses of closely spaced particulate material in a confined path through an area having an elevated gaseous pressure and then removing the masses to a zone of lower pressure.

The present invention relates to a continuous texturizing process in which a rope of untextured protein dough is extruded into a moving stream of hot, pressurized gas. The rope may be cut into segments or pieces just prior to or at the time of the dough's entrance into the stream of gas. The segments are carried in the stream to a zone of lower pressure such as atmospheric pressure. The segments or pieces of dough are textured and expanded. The term "texturizing" as used herein will refer to the process of changing the discrete portions or particles of protein into continuous phase protein and expanding or puffing the protein material.

Apparatus suitable for carrying out the present invention is shown in the drawing.

The apparatus 10 which may be used for carrying out the present invention, includes a texturizing tube 11, a gas source (preferably steam) 12, an extruder 13 and a cutter 14. The tube 11 may be constructed from steel pipe 17. A steel pipe having an internal diameter of 1¾ inches was used in Examples I–VI. The tube 11 has a rear wall 18 which may be secured in place such as by welding. The tube 11 has a nozzle or restricted area 19 at the forward end thereof which permits maintenance of an elevated pressure in tube 11 during operation. The nozzle used in the following examples had an opening of ½ inch. The tube 11 has a transversely extending connecting pipe 22 which is secured to pipe 17 such as by welding. The connecting pipe 22 communicates with an opening 24 in pipe 17. The connecting pipe 22 further includes a flange 23 for securing the extruder 13 to the tube 11. The tube 11 has an opening 25 for purposes hereinafter described.

The gaseous source 12 may be a boiler that is capable of producing a steam pressure sufficient for texturization. Alternatively, any apparatus may be used which is suitable for providing hot gas such as steam, air, carbon dioxide and nitrogen gas at a temperature and pressure sufficient to texturize the protein. The gaseous source 12 is connected to tube 11 by line 27.

The extruder 13 may be of any type capable of producing a rope of untextured protein dough and feeding the rope into the steam tube 11. The extruder 13 has a barrel 28 with a flange 29 near the forward end thereof. The flange 29 is used to secure the extruder 13 to the flange 23 of steam tube 11 such as by bolts 30. The barrel 28 may be either rifled or unrifled. The extruder 13 has a hopper 33 which may be suitably attached to barrel 28 such as by bolts (not shown) or by welding. The extruder 13 has a flighted screw 36 disposed in the barrel 28 for mixing, working and extruding the rope of protein dough. The forward end of the extruder may have a die 37 for final shaping of the dough. The die 37 has a plurality of ports 43 which provide for extrusion of ropes for example ¼ to ½ inch in diameter. The pressure developed by the screw must be sufficient to force the dough through the ports and sufficient to overcome the back pressure of the steam in tube 11. The pressure at the die 37 will typically be about 500 p.s.i.g. or more. The screw 36 is driven by a motor 45. The extruder should be a low work extruder and primarily serves the purpose of shaping and feeding of the dough. For example, if desired, the dough may be produced by the mixing action of the screw on a mixture of protein flour and water which is added through hopper 33. The water may be mixed with the protein material prior to the addition to hopper of the extruder, for example by agglomeration techniques using any type of apparatus that will intimately mix the protein material and the water such as a high impact agglomerator, a cake finisher or a Hobart® mixer. Alternatively, the water may be added to the protein material in the extruder.

The cutter 14 includes a motor 38 which drives a rotating shaft 39 carrying a cutting blade 40. The shaft 39 extends through opening 25 in pipe 17. A seal 41 is provided in opening 25 to prevent escape of steam therethrough.

The apparatus 10 may be placed in operation by simultaneously starting the steam flow and the dough extrusion or by first starting the extrusion and then the steam flow. Steam from the steam source 12 passes through steam line 27 and into tube 11 thereby building up steam pressure in the tube 11 to operable levels. The maximum pressure used in steam tube 11 is limited only by the particular apparatus used. For example, pressures as high as 140 p.s.i.g. have been used. On the other hand pressures as low as 15 p.s.i.g. may be used in texturizing the protein material. The preferred pressure conditions of the present invention are normally at least 25 p.s.i.g., generally at least 55 p.s.i.g., typically 80 to 140 p.s.i.g. It has been found that an increase in pressure generally results in an increase in blandness, texturization and/or expansion. The temperature in tube 11 during steam treatment will generally be at least 250° F. and may be as high at 500° F. or higher.

Feed materials including protein material and water may be added to extruder 13 through hopper 33. The screw when started up, mixes, works and extrudes the resulting protein dough into the steam tube 11. The barrel of the extruder may be heated such as with electrical resistance coils to a temperature of from 212 to 310° F. The protein material may be protein flour, meal or concentrate, for example, of soybean, peanut, cottonseed, safflower and sesame seed. The protein content of the protein material should be at least 30% (dry weight basis) and preferably about 50 to 75%. The water is added in an amount sufficient to form a dough, typically the total moisture content will be about 20 to 40%, preferably about 25 to 35% by weight. The dough as it leaves the extruder 13 is cut into segments or pieces 42 by blade 40 of cutter 14. The segments or pieces are then carried in the stream of steam through the nozzle 19 and are textured and expanded. The pieces may be collected in container 46.

The present invention provides textured protein having acceptable water holding capacity and acceptable texture. The water holding capacity of the textured protein is desirably in the range of 2 to 3 for most uses such as meat extending uses. The water holding capacity of the protein may be less in other uses, such as 1.5 in simulated beef chunks. The terms "water holding capacity" as used herein refers to the total amount of water the protein material is able to hold and is determined by soaking the texturized protein in an excess of water for 20 minutes and then draining for five minutes. The water holding capacity is equal to the wet weight minus the dry weight and that value divided by the dry weight. Texture of the protein material may be measured in shear press values. Shear press values for texturized protein of the present invention will generally be in the range of 300 to 1500 pounds as determined by the following procedure. Sample is prepared for measurement by weighing out 75 grams (dry weight basis) of texturized protein material. The sample is placed in an excess of cold water and soaked at about 40° F. for 1.5 hours. The sample is drained for five minutes and divided into 3 equal parts by weight. The three parts are wrapped in plastic and allowed to stand at room temperature for 20 minutes. Each of the parts are tested in the Allo-Kramer shear press (Ser. No. 1,042, Model No-5-2H) using a 10 bladed head according to conventional techinques using a 2500 pound ring and the three values are added together.

Protein which has been texturized according to the present invention is quite different from protein which has been texturized according to previously known processes. For example, the texturized protein has a taste which is surprisingly mild and bland. The processed protein material leaves the apparatus as discrete chunks rather than as a rope and thus is ideal for preparing simulated chunks of beef. The product has a puffed-like structure with smaller voids than that of previously known texturized protein. Also, the voids are of random orientation. The texturized protein material appears to be layered.

The textured protein of the present invention may be used for the same purposes and in substantially the same manner as previously known types of texturized protein. The protein material, as it comes from the texturizing apparatus, may be impregnated with conventional meat analog serum typically including binder, flavoring and water, thereby producing a simulated beef chunk or a simulated chicken chunk. The protein material may be ground, such as with a Comitrol® cutter, hydrated and mixed with ground beef or pork sausage, thus acting as a meat extender. Alternatively, the texturized material may be finely chopped and impregnated with a conventional meat analog serum, thereby producing a simulated ground beef or simulated ground pork. For example, simulated ground beef may be prepared by mixing, by weight about 3.5 parts beef tallow, 4.3 parts corn flour, 1.7 parts egg albumin, 1.2 parts brown sugar, 1.2 parts onion powder, 1.0 part salt, 50 parts water, 24 parts texturized protein material, beef flavoring and sufficient caramel coloring to obtain the desired cooked hamburger color. The mixture may be heated to set the egg albumin.

The following examples are for purposes of illustrating the present invention and are not intended to be limiting.

EXAMPLE I

Texturized protein material was prepared according to the present invention from a dry blended mixture containing 70 parts soybean concentrate (Textrol [1]) and 30 parts soybean isolate (Promine R [2]). The term "parts" as used herein will refer to parts by weight, on an as is moisture basis, the moisture content normally being about 6%. Sufficient water was added to the protein material to raise the total moisture content to 35% by weight. The water was added to and mixed with the protein material in a high impact agglomerator. The temperature of the extrusion barrel was 250° F. Untextured dough was extruded into the steam tube 11 as four ropes each having a ¼ inch diameter. The ropes were cut into segments ½ inch long. The steam pressure in tube 11 was 150 p.s.i.g. and the temperature was 475° F. The product leaving the nozzle was texturized. The product had a water holding capacity of 2.6.

EXAMPLE II

Textured protein material was prepared according to the present invention from a dry blended mixture containing 70 parts soybean concentrate (Textrol®) and 30 parts soybean isolate (Promine R®). Sufficient water was added to the material to raise the total moisture content to 34%. The mixture was placed in the hopper of the texturizing apparatus. The temperature of the barrel of the extruder was 290° F. The high pressure gaseous source was air at a pressure of 70 p.s.i.g. and a temperature of 450° F. The product was tough, light brown, close structured and well textured. The product had a water holding capacity of 1.2.

EXAMPLE III

Texturized protein material was prepared according to the present invention from a dry blended mixture containing 70 parts soybean concentrate (Textrol®) and 30 parts soybean isolate (Promine R®). The material was processed as described in Example II except that the high pressure source was a mixture of 50% air and 50% steam. The barrel temperature was 275° F. The pressure in the texturizing tube was 75 p.s.i.g. and the temperature was 450° F. The product was textured. The product had a shear press value of 985 pounds and a water holding capacity of 2.0.

EXAMPLE IV

Example II was repeated except the pressure in the tube 11 was maintained at atmospheric pressure. The product was not textured.

EXAMPLE V

Texturized protein material was prepared according to the present invention from a dry blended mixture containing 85 parts soybean concentrate and 15 parts soybean isolate. Sufficient water was added to the mixture in a high impact agglomerator to raise the total moisture content to 25%. The hydrated mixture was placed in the hopper of the texturizing apparatus and extruded into the tube. Steam was passed through the tube at a temperature of 485° F. and a pressure of 130 p.s.i.g. The barrel of the extruder was held at a temperature of 250° F. The product leaving the nozzle of the apparatus was texturized.

---

[1] Textrol® is a processed soy protein material having a minimum protein content of 63.5% and produced by Central Soya Co., Inc.

[2] Promine R® is an isolated soy protein material having a protein content of about 95% and produced by Central Soya Co., Inc.

EXAMPLE VI

Texturized protein material was prepared from soybean concentrate. Sufficient water was added in a high impact agglomerator to raise the total moisture content to 34%. The hydrated protein material was extruded into the tube which was carrying a stream of steam at 475° F. and 90 p.s.i.g. The barrel of the extruder was held at a temperature of 300° F. The product leaving the nozzle was texturized.

The embodiments of the invention in which an exclusive property or privileges is claimed are defined as follows:

1. A method for texturizing protein material, said protein material being capable of texturization and having a protein content of at least 30%, dry weight basis, said method comprising: forming a dough of said untextured protein material and water, said dough having a moisture content of about 20 to 40% by weight, extruding a continuous rope of said untextured protein dough, cutting said rope into segments, propelling a stream of gaseous fluid and said segments in a confined path through an area having a gaseous pressure of at least 15 p.s.i.g., and a temperature of at least 250° F., said temperature and pressure being sufficient to texturize the protein, said segments being carried by said stream through said confined path and to a zone of lower pressure thereby texturizing said protein material.

2. The method of claim 1 wherein the gas is steam.

3. The method of claim 2 wherein the steam pressure is at least 55 p.s.i.g.

4. The method of claim 3 wherein the moisture content is about 25 to 35% by weight.

5. The method of claim 1 wherein the gaseous pressure is at least 80 p.s.i.g.

6. The method of claim 1 wherein the rope is extruded directly into said confined path.

7. A method for texturizing protein material comprising: working a mixture of untextured protein material and water in a screw extruder to form an untextured protein dough, said protein dough being capable of texturization, extruding a continuous rope of said untextured protein dough, cutting said rope into pieces, treating said pieces in an elongated cylinder, said elongated cylinder carrying a continuous stream of heated steam at a temperature and pressure sufficient to texturize said protein material, said temperature being at least 250° F. and said pressure being at least 15 p.s.i.g., said stream of heated steam carrying said pieces through said cylinder and into a zone of lower pressure thereby texturizing said dough.

8. The method of claim 7 wherein the gaseous pressure is at least 80 p.s.i.g.

9. The method of claim 7 wherein the moisture content is about 25 to 35% by weight and wherein the protein material is at least 30% protein.

10. The method of claim 7, wherein the moisture content is about 20 to 40% by weight and wherein the protein material is at least 50% protein.

References Cited
UNITED STATES PATENTS

| | | | |
|---|---|---|---|
| 3,142,571 | 7/1964 | McAnelly | 99—14 |
| 3,288,053 | 11/1966 | Perttula | 99—238 |
| 3,272,110 | 9/1966 | Tsuchiya | 99—238 |
| 3,231,387 | 1/1966 | Tsuchiya et al. | 99—238 X |

A. LOUIS MONACELL, Primary Examiner

W. A. SIMONS, Assistant Examiner

U.S. Cl. X.R.

260—123.5; 426—464, 516